United States Patent
Farries et al.

(10) Patent No.: US 6,607,313 B1
(45) Date of Patent: Aug. 19, 2003

(54) MICRO-OPTIC DELAY ELEMENT FOR USE IN A POLARIZATION MULTIPLEXED SYSTEM

(75) Inventors: Mark Farries, Nepean (CA); Yihao Cheng, Kanata (CA)

(73) Assignee: JDS Fitel Inc., Ottawa (CA)

( * ) Notice: Subject to any disclaimer, the term of this patent is extended or adjusted under 35 U.S.C. 154(b) by 0 days.

(21) Appl. No.: 09/342,154

(22) Filed: Jun. 23, 1999

(51) Int. Cl.[7] .................................................. H04J 14/08
(52) U.S. Cl. ...................... 398/102; 398/152; 398/65; 398/182; 398/183; 398/184; 398/161; 398/147
(58) Field of Search ............................ 398/152, 65, 102, 398/183, 184, 147, 182, 161

(56) References Cited

U.S. PATENT DOCUMENTS

| | | | | |
|---|---|---|---|---|
| 3,752,992 A | * | 8/1973 | Fluhr ........................ 250/199 |
| 5,069,520 A | * | 12/1991 | Calvani et al. ................. 385/1 |
| 5,111,322 A | * | 5/1992 | Bergano et al. ............. 359/122 |
| 5,134,361 A | * | 7/1992 | Pillow ........................ 324/96 |
| 5,428,697 A | * | 6/1995 | Dolfi et al. ................... 385/24 |
| 5,491,576 A | * | 2/1996 | Bergano ..................... 359/156 |
| 5,654,818 A | * | 8/1997 | Yao ............................. 359/246 |
| 5,703,708 A | * | 12/1997 | Das et al. ................... 359/140 |
| 6,014,256 A | * | 1/2000 | Cheng ........................ 359/495 |
| 6,067,180 A | * | 5/2000 | Roberts ...................... 359/181 |
| 6,122,086 A | * | 9/2000 | Djupsjobacka .............. 359/181 |
| 6,256,124 B1 | * | 7/2001 | Hait ............................ 359/123 |
| 6,317,243 B1 | * | 11/2001 | Price .......................... 359/181 |
| 6,360,037 B1 | * | 3/2002 | Riza ............................. 385/22 |

OTHER PUBLICATIONS

Y. Miyamoto, K. Yonenaga, et al., "104–Tbit/s DWDM Transmission Experiment Based on Alternate–polarization 80–Gbit/s OTDM Signals," *ECOC '98*, Madrid, Spain, Sep. 20–24, 1998, pp. 55 and 57.

* cited by examiner

*Primary Examiner*—Leslie Pascal
*Assistant Examiner*—Hanh Phan
(74) *Attorney, Agent, or Firm*—Neil Teitelbaum

(57) ABSTRACT

A micro-optical delay element for a polarization time-division multiplexing scheme is disclosed wherein two light beams are provided to a polarization beam splitter/combiner (PBS/C) in the absence of optical fiber. At least one beam exiting a modulator is collimated and reaches the (PBS/C) unguided as a substantially collimated beam. In this manner the polarization state of the beam is substantially unchanged. This obviates a requirement for polarization controllers.

21 Claims, 8 Drawing Sheets

MICRO-OPTIC DELAY ELEMENT FOR USE IN A POLARIZATION MULTIPLEXED SYSTEM

FIELD OF THE INVENTION

This invention relates generally to optical fiber communications and in particular to multiplexed communications that uses polarization multiplexing.

BACKGROUND OF THE INVENTION

High-speed time-division-multiplexing (TDM) is a very attractive way of enhancing the spectrum efficiency of a large-capacity wavelength-division multiplexing (WDM) system. One common architecture employs two modulators having a same bit rate, wherein two separately modulated streams of data bits are combined into a high-speed single serial stream of data bits. Instead of providing a single higher-cost higher-speed modulator capable of providing modulation at a frequency of n Hz, two modulators having a frequency of n/2 Hz are provided and their outputs are time-interleaved providing a signal having a frequency of n Hz. However, one drawback to such a scheme, particularly in high-speed dense systems is that pulses from adjacent time slots spread and partially overlap one another and detection errors sometimes occur at a receiver end.

One remedy for this is provided by an enhanced TDM system wherein adjacent interleaved pulses are distinguishable as they are orthogonally polarized. Such a scheme is described in a paper entitled 1.04-Tbit/s SWDM Transmission Experiment Based on Alternate-Polarization 80-Gbit/s OTDM Signals, by Yutaka Miyamoto et al., published in ECOC'98 20–24 September 1998 Madrid, Spain. In this paper alternate-polarization optical-TDM is described to increase the bit rate while keeping the signal spectrum from broadening. Here two modulated signals are time-division multiplexed with additional enhancement being achieved by polarization multiplexing of the two interleaved TDM streams.

Another system using enhanced polarization optical TDM is described and illustrated in U.S. Pat. No. 5,111,322 in the name of Bergano et al, entitled Polarization Multiplexing Device with Solitons and Method Using Same, incorporated herein by reference. In this patent, a transmission system's capacity is increased by using a combination of polarization and time-division multiplexing. More specifically, two streams of differently (preferably orthogonally) polarized solitons are interleaved (time-division-multiplexed) at a transmitter, and later separated at the receiver to recover both data streams.

The multiplexing of 2 channels of 2.5 Gbits/s each, into a single 5 Gbits/s channel, and the corresponding demultiplexing at the receiving end, is described in conjunction with the multiplexor of FIG. 2 in prior art U.S. Pat. No. 5,111, 322.

In FIG. 2 the signal source for the two channels is a single, mode-locked laser 201, producing about 35–50 ps wide soliton pulses at a 2.5 GHz rate. Its output is split into two soliton pulse streams having essentially orthogonal polarizations, in a splitter 202, and each half separately modulated (with different information bearing signals labeled Data 1 and Data 2) in modulators 205 and 206. Modulator 205 receives a first information bearing signal or data stream on line 207, while modulator 206 receives a second data stream on line 208. The two soliton pulse streams then recombine in a splitter 210, but only after one of the pulse streams is delayed by one-half of the 2.5 Gbit/s bit period in an adjustable delay line 209 so that the two pulse streams are interleaved in time.

A few practical details concerning the apparatus of FIG. 2 are in order here. The modulators 205, 206 should preferably be of the LiNbO.sub.3, balanced Mach-Zehnder type, as those produce virtually no chirping of the soliton pulses, and have an adequate on-off ratio (about 20 dB). The required linear polarizations at the inputs to modulators 205, 206, and for the polarization multiplexing itself, can either be maintained through the use of (linear) polarization-preserving fiber throughout the multiplexor, or through the use of polarization controllers, such as controllers 211–214, both before and after modulators 205, 206 as shown in FIG. 2. Polarization controllers 211–214 may be arranged as described in an article by H. C. Levevre, "Single-Mode Fiber Fractional Wave Devices and Polarization Controllers", Electronics Letters, Vol. 16, p. 778, 1980. For the temporal interleaving of the two soliton pulse streams, it is necessary to make precise adjustment of the relative lengths of the two arms of the multiplexor. This can be done with adjustable delay line 209 which is shown interposed between the output of modulator 206 and polarization splitter 210. Nevertheless, delay line 209 is not absolutely necessary. It is also possible to trim the length of one or the other arm, through one or two trials, to within a few picoseconds of the correct length so the apparatus may remain all-waveguide throughout.

The original soliton pulse stream output from the correctly adjusted multiplexer of FIG. 2 would appear as shown in FIG. 3. The x and y axes represent intensities of pulses of different (orthogonal) polarizations. As an example, soliton pulses 301 and 302 have an initial polarization along the axis and a period of 400 ps. Soliton pulses 303 and 304 have an orthogonal (y direction) polarization, the same period, and are time interleaved with the first series of pulses. Information is carried in the pulse streams by virtue of the presence or absence of pulses at the expected or nominal positions on the time axis. Note that launching the soliton pulses as in FIG. 3 not only achieves the potential for combined time and polarization division demultiplexing at the receiving end, but also virtually eliminates the potential for cross-phase modulation, and hence virtually eliminates the potential for interaction during transmission, between the two channels. An alternative circuit to FIG. 2 is shown in FIG. 1, wherein two laser sources are shown, oriented to provide two orthogonally polarized beams; in all other respects, the circuit of FIG. 1 functions in a similar manner to the circuit of FIG. 2, however is absent the polarization controllers 211 and 212.

The aforementioned prior art reference by Miyamoto et al. teaches the use of delay lines to time-skew the pulse trains that are to be multiplexed. For example, the paper discloses using two different lengths of polarization maintaining fibre in order to create a suitable delay. Although using different lengths of optical fibre provides a necessary delay, ensuring that this delicately balanced network is stable over a range of temperatures is not trivial.

Althhough the prior art optical circuits to some degree provide solutions for polarization time-division multiplexing, the '322 patent for example describes a rather complex optical circuit where polarization controllers are shown to control the polarization state of the light propagating through the optical fibres.

In contrast, the circuit in accordance with this invention is a micro-optic circuit that does not rely on the use of polarization controllers and does not require polarization-maintaining optical fibre.

Furthermore, an aspect of the instant invention provides a micro-optic delay element, which utilizes the polarization difference between two data-streams to be time-multiplexed while preserving the polarization state of the two orthogonal streams. Furthermore, the instant invention provides a solution, which is considerably, more temperature-stable than using two separate waveguides and independently controlling for any temperature difference between the two waveguides.

SUMMARY OF THE INVENTION

In accordance with the invention a circuit is provided for receiving two streams of data and for polarization time-division multiplexing the two streams of data onto a single waveguide such that one of the data streams is delayed by a time $t_d$ from the other data stream, comprising:

- a first modulator having an input port and an output port for modulating input light and for providing a first modulated data stream;
- a second modulator having an input port and an output port for modulating input light and for providing a second modulated data stream;
- a first lens for collimating light provided by the first modulator;
- a second lens for collimating light provided by second modulator,
  - the first and second lenses each for providing a substantially collimated substantially unguided beam of light to at least another component;
- a polarization beam splitter/combiner having two input ports at one end optically coupled to receive the substantially collimated, substantially unguided beams of light, said polarization beam splitter/combiner having a combining port at another end for combining the data streams such that one data stream delayed by a time $t_d$ from the other data stream,
- light traversing parallel paths from the first and second lenses respectively to the polarization beam splitter combiner being substantially unguided, so that light traversing at least one of said parallel paths will have a polarization state which is substantially unchanged.

In accordance with the invention, there is provided a circuit for receiving two streams of modulated data and for polarization and time-division multiplexing the two streams onto a single waveguide, comprising:

- a polarization rotator for rotating the polarization of one of the two modulated data streams; and,
- a birefringent crystal having at least two input ports disposed at one end to receive the two modulated data streams having orthogonal polarization states, the birefringent crystal having an output port disposed at an opposite end to receive and combine the two modulated data streams into a single time-interleaved data stream, the birefringent crystal being of suitable length for providing a path length difference between each of the at least two input ports and the output port to provide a required time delay at the output port between the two data streams.

In accordance with the invention, there is provided a circuit for receiving two streams of modulated data and for polarization and time-division multiplexing the two streams onto a single waveguide, comprising:

- a light source for providing a primary signal;
- a first and a second modulator for independently, and in parallel modulating the primary signal, the first and second modulators for providing two data streams;
- means for operating on at least one of the two data streams relatively orthogonalizing the two data streams; and,
- a birefringent crystal having at least two input ports at an end thereof disposed to receive the two modulated data streams having orthogonal polarization states, the birefringent crystal having an output port disposed at an opposite end thereof to receive and combine the two modulated data streams into a single time-interleaved data stream, the birefringent crystal being of suitable length for providing a path length difference between each of the at least two input ports and the output port to provide a required time delay at the output port between the two data streams.

In accordance with another aspect of the invention, a method of multiplexing optical signals onto an output port is provided. The method comprises the steps of:

providing two modulated polarized optical signals having a polarization difference between the two modulated signals of substantially 90 degrees;

passing one of the two modulated signals along a first path in a birefringent crystal; passing another of the two modulated signals along a second path intersecting the first path at the output port of the birefringent crystal.

In accordance with the invention there is provided a fibreless optical circuit for receiving two streams of modulated data and for polarization multiplexing the two data streams onto a single waveguide, comprising:

- a modulator module for independently, and in parallel, modulating optical signals and for providing two data streams;
- a birefringent crystal having at least two input ports at an end thereof disposed to receive the two modulated data streams having different polarization states, the birefringent crystal having an output port disposed at an opposite end thereof to receive and combine the two modulated data streams into a single multiplexed data stream, the birefringent crystal being of suitable dimensions to provide time division polarization multiplexing, the circuit being fibreless such that there is an absence of optical fibre between the modulator module and the birefringent crystal for coupling light therebetween.

Conveniently, if a delay is required that exceeds the delay that is provided by traversing the first and second paths of the birefringent crystal having different optical lengths, a spacer can be inserted into each of the signal paths prior to the signals reaching the birefringent crystal, wherein the spacers are of a substantially different refractive index. This method is quite suitable when optically coupling a lithium niobate modulating block with a rutile crystal, wherein no optical fibres are used except perhaps coupled to output ports.

In summary, the devices in accordance with this invention are small and compact and integrated. Yet still further, due to their compactness are somewhat easier to temperature control than, for example the prior art circuits shown. Yet still further, and perhaps more importantly, the optical circuit including the modulator focusing optics between the modulator and a polarization beam splitter/combiner do not require any optical fibre for coupling of light therebetween. Advantageously, by an providing a relatively unguided light path, polarization controllers or polarization maintaining fibre is not required. As well by providing block like elements coupled to one another, i.e. one or more modulator blocks coupled to rod GRIN lenses, coupled to a birefringent crystal yields a compact easy to assemble device that can be conveniently packaged.

BRIEF DESCRIPTION OF THE INVENTION

Exemplary embodiments of the invention will now be described in conjunction with the drawings in which.

DETAILED DESCRIPTION

Figure 4:
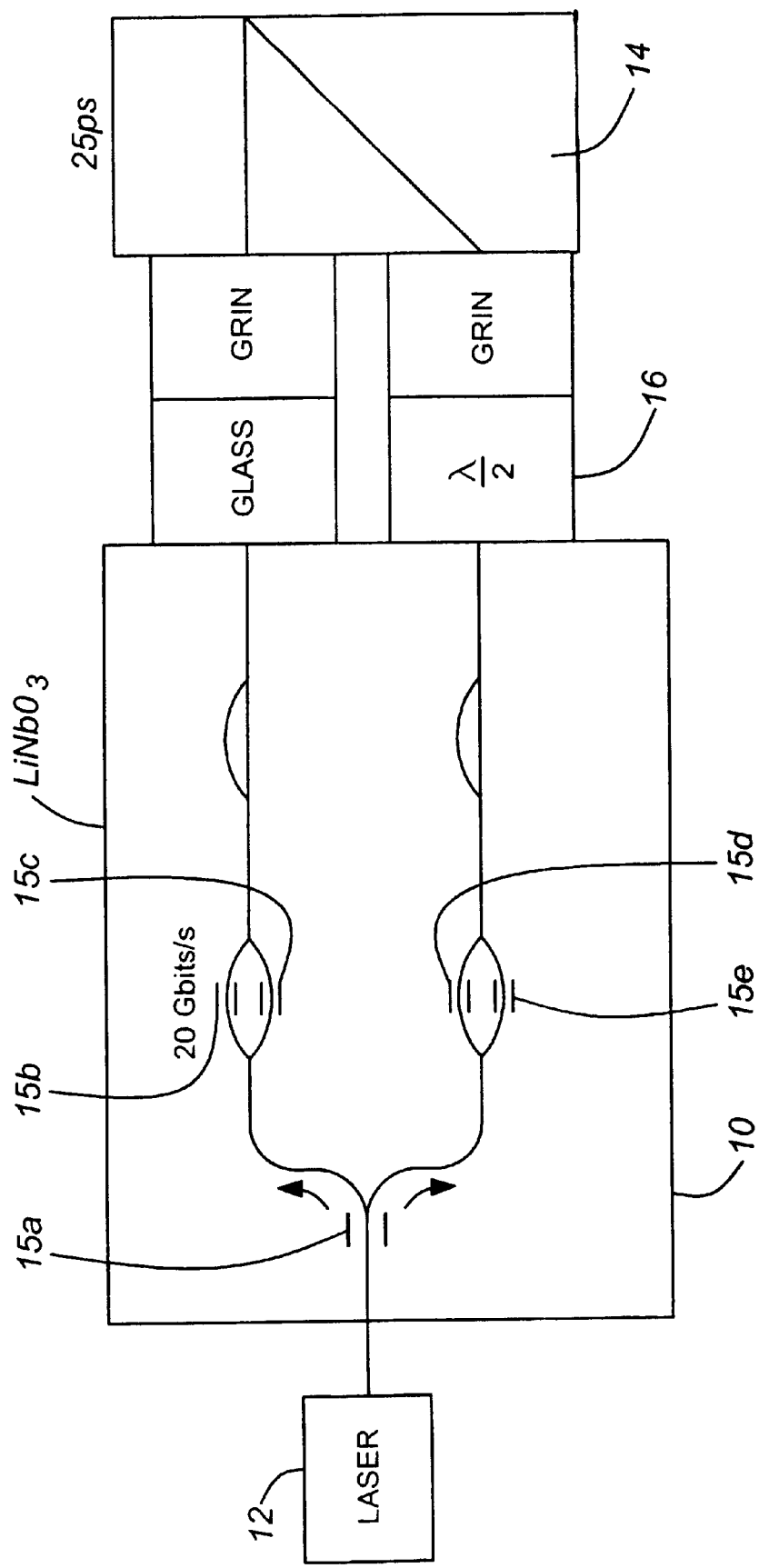
FIG. 4 illustrates a schematic circuit block diagram of an enhanced TDM multiplexor in accordance with this invention.

Turning now to FIG. 4, a substantially integrated microoptic circuit is shown having a slab waveguide chip 10 having an end optically coupled with a laser 12 and having an end optically coupled with a birefringent crystal 14. At an input end of the crystal 14, a half waveplate 16 is provided for rotating the polarization of the light passing therethrough by 90°.

Figure 1:
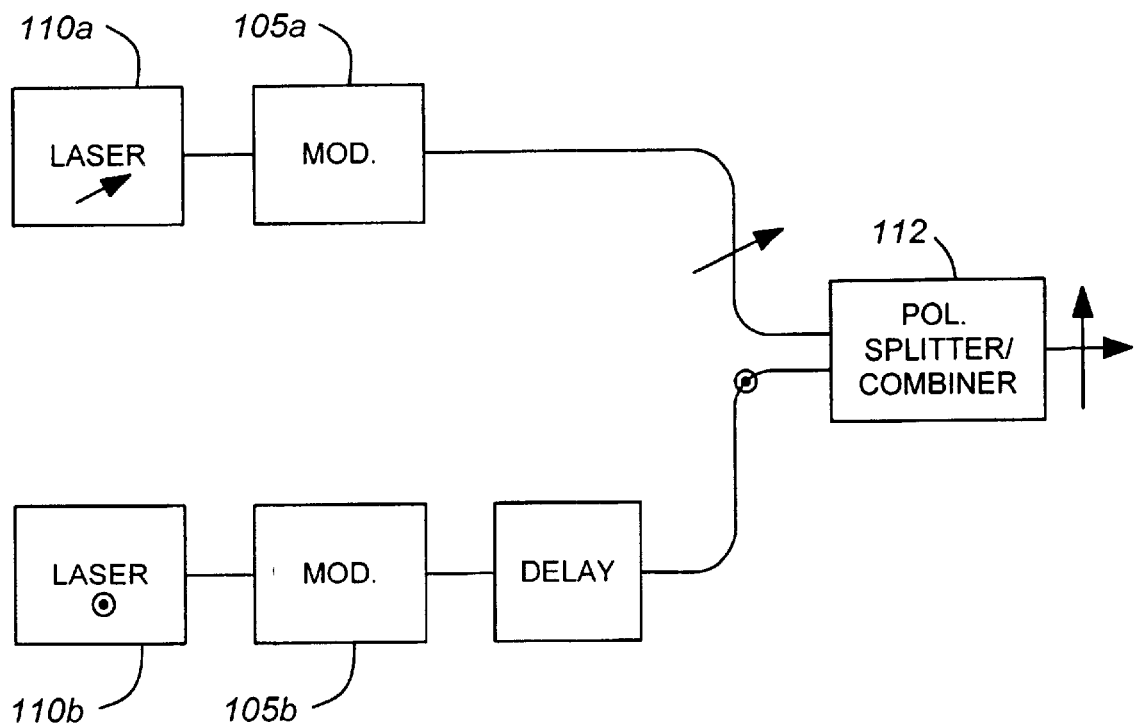
FIG. 1 is a prior art schematic diagram of a multiplexing circuit using 2 laser light sources oriented to yield orthogonal polarized light.
Figure 3:
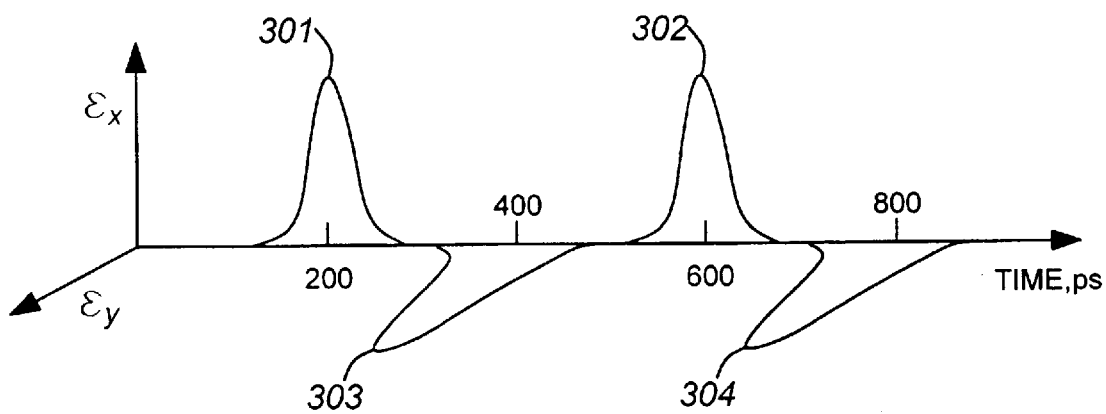
FIG. 3 illustrates the pulse field envelopes at the output of the multiplexor of FIG. 2.
Figure 2:
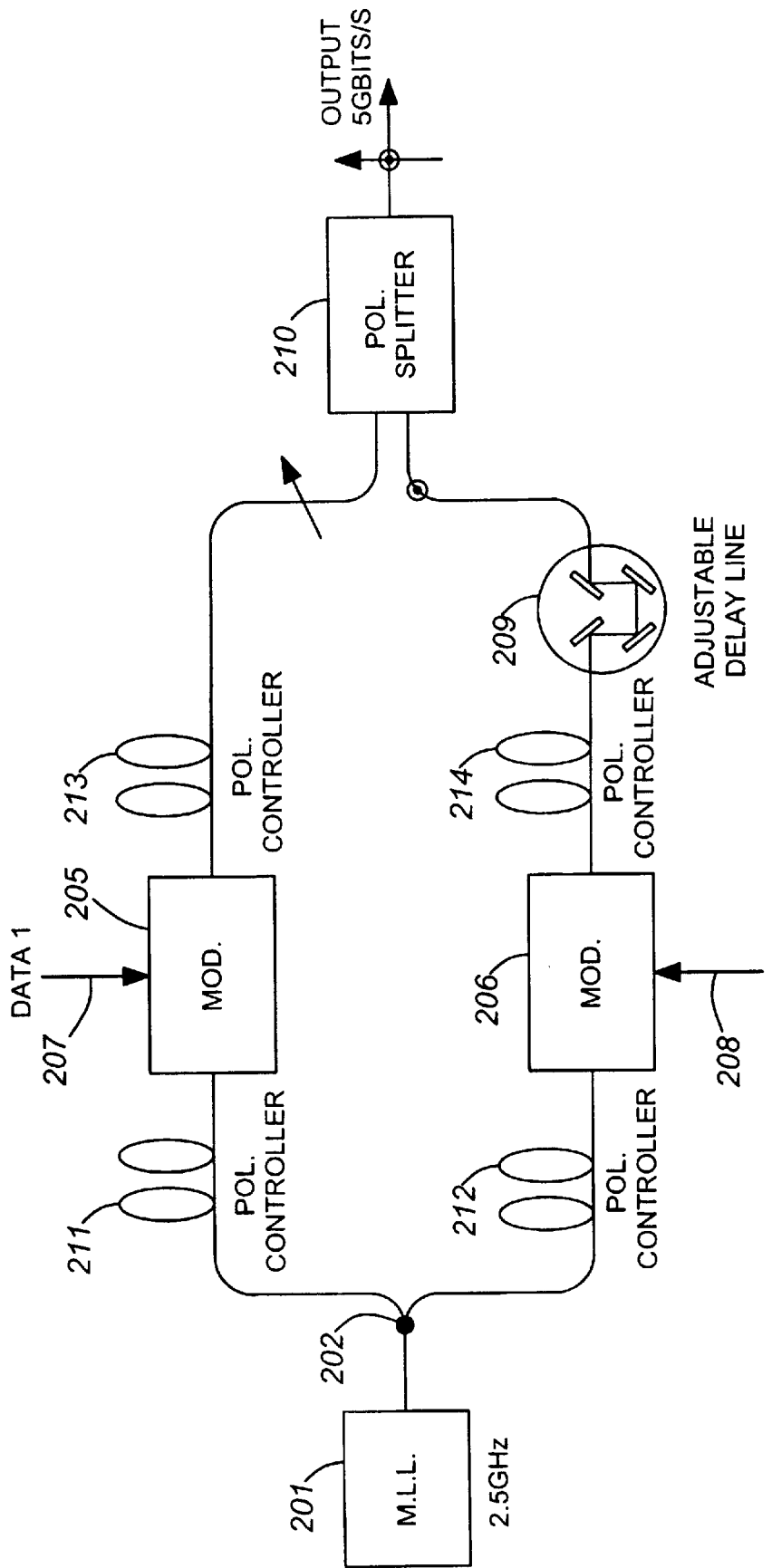
FIG. 2 illustrates a prior art schematic of a multiplexing circuit.

The slab waveguide chip is LiNbO$_3$ having waveguide disposed therein. The waveguides can be formed by ion implantation or alternatively by grafting polymer or other such light transmissive material into the chip. Electrical contacts 15a, 15b, 15c are disposed about the waveguides and in operation a voltage is applied to modulate the signal passing between the contacts. Variable attenuators are provided at the output for controlling the amplitude of the modulated signals. Although LiNbO$_3$ is a preferred modulator, of course other types of modulators my be used, for example electro-absorption or GaAs. Aside from the compactness and temperature stability of the circuitry shown within the waveguide 10, the operation and interconnection of the components is substantially similar to the circuitry shown if FIG. 2. Notwithstanding, one major difference between the circuit of the instant invention, shown in FIG. 4 and the prior art circuits, is the provision of the birefringent crystal for use as a polarization combiner and delay line for time-division polarization interleaving of pulses. One even more significant difference in this circuit and prior art circuits for time-division polarization multiplexing is the fibreless nature of the circuit from the modulator module 10 to the beam splitter/combiner, for example shown here in the form of a crystal 14. By coupling substantially collimating lenses, for example, quarter pitch GRIN lenses to the modulator 10, collimated beams are provided to next elements in sequence and to the crystal 14. Since the substantially collimated beam traverses the glass spacer and half waveplate substantially unguided, its polarization state is substantially unaltered.

Figure 5:
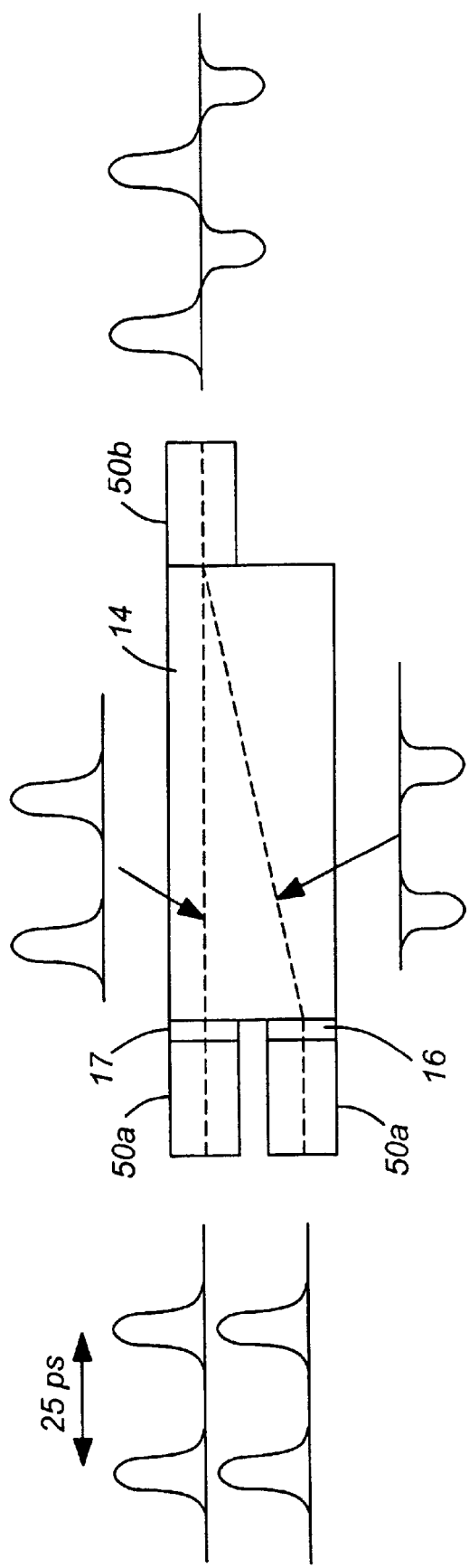
FIG. 5 is a schematic block diagram which illustrates a portion of the circuit used for multiplexing and which illustrates the operation of that circuit portion.
Figure 6:
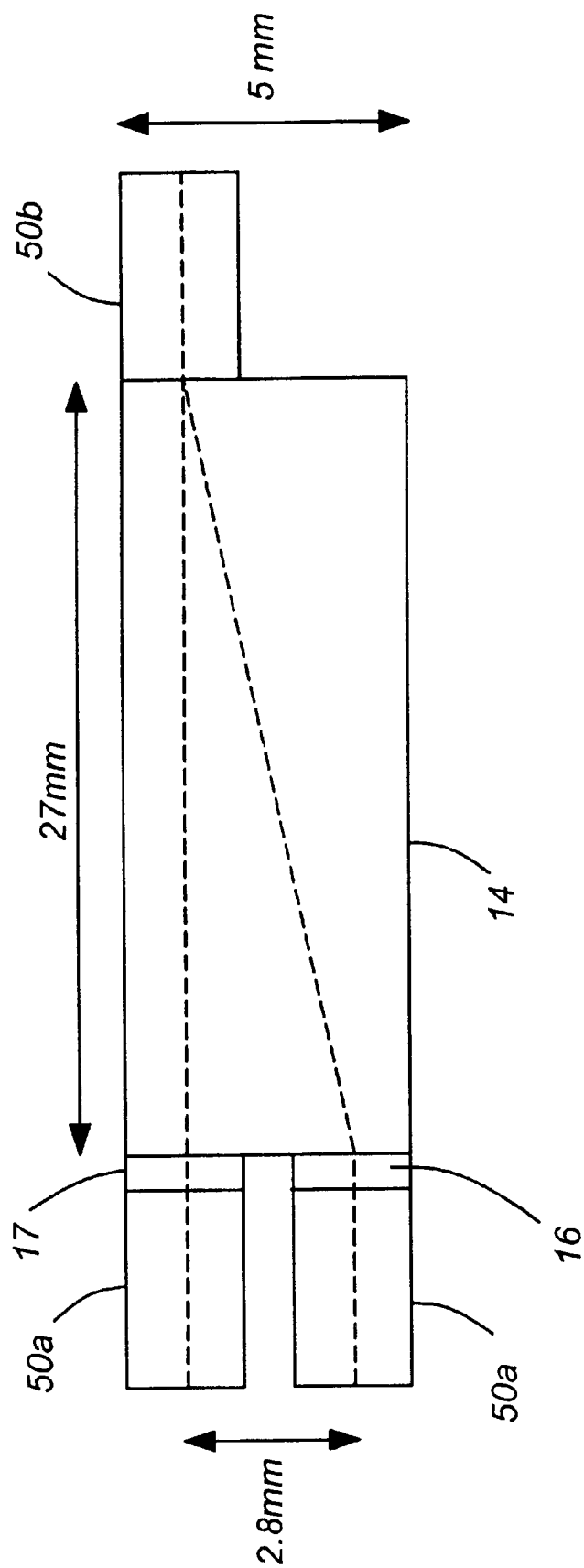
FIG. 6 is a more detailed embodiment illustrating the circuit of FIG. 5.
Figure 7:
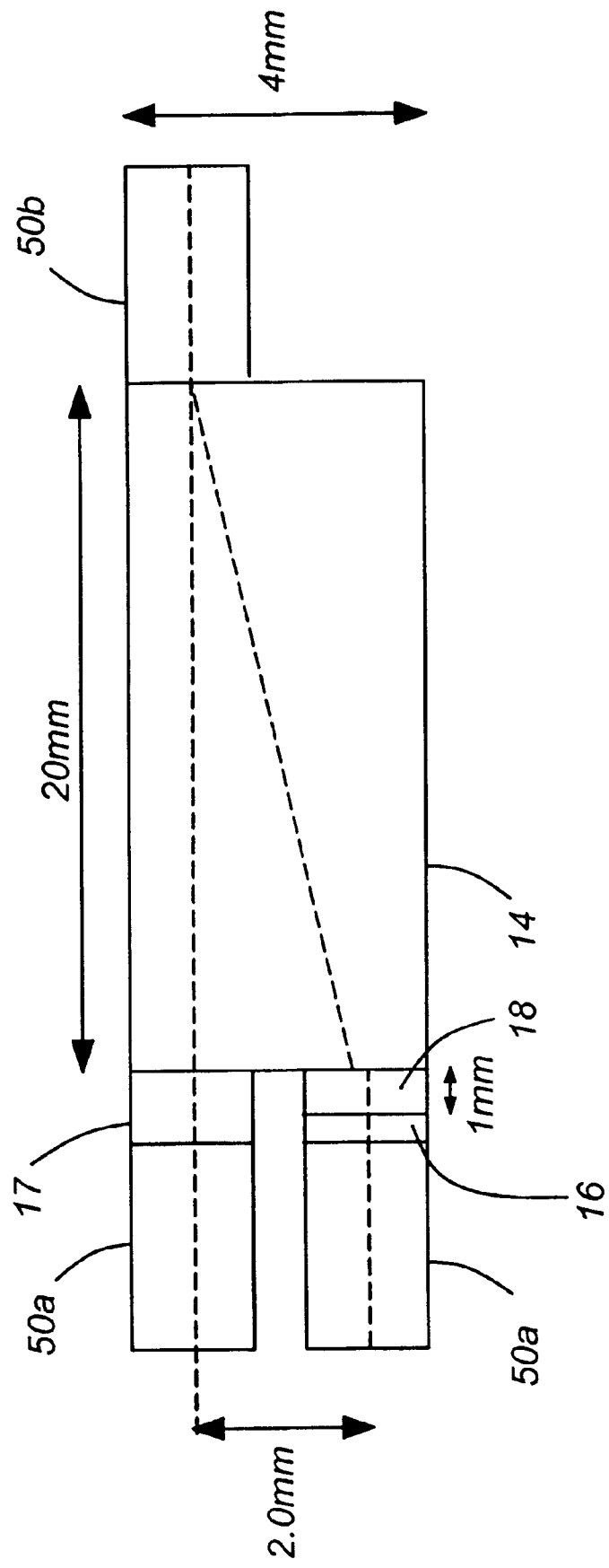
FIG. 7 is an alternative embodiment to the circuit of FIG. 6, wherein two spacers having different refractive indices are utilized to achieve a time delay between signals traversing the two spacers.

FIG. 5 illustrates a portion of the circuit shown in FIG. 4 depicting the operation of the polarization combining and multiplexing circuit. This circuit conveniently provides the added advantage of achieving a predetermined required delay. A stream of pulses spaced by 25 ps are provided at the input end of each of the GRIN lenses 50a. Light directed through the bottom GRIN lens is rotated by 90 degrees by the half waveplate 16. As can be seen in figure, this beam must travel a greater distance to reach GRIN lens 50b, than the beam that follows a straight through path launched into the upper GRIN lens 50a. This in effect skews the pulses in time that were launched simultaneously into the two GRIN lenses such that the orthogonally polarized pulses become combined and time multiplexed, as shown at the output of the GRIN lens 50b. FIG. 6 (not drawn to scale) illustrates in more detail, dimensions of a birefringent or rutile crystal that achieves a desired time delay to provide time multiplexing of these two orthogonally polarized streams of pulses. The length of the crystal in this exemplary embodiment is 27 mm, and the with is 5 mm. Of course to some extent, the size of a crystal that is required is proportional to it cost. FIG. 7 illustrates yet another embodiment, wherein a spacer of glass 17 is inserted into the upper optical path, and a spacer of silicone 18 provides a portion of the lower optical path. By selecting light transmissive materials such as glass and silicone that have a substantially different refractive indexes in the two paths the beams must follow, delays in addition to delay provided by the birefringent crystal 14 can be enhanced and further controlled between the two. For example, in FIG. 7, the silicone spacer 18 shown, has a much higher refractive index than the glass spacer 17; light traveling through the silicone propagates therethrough slower than light traveling through a similar length of glass. Notwithstanding, a birefringent crystal of at least some minimum proportions is required. In the example shown, the beams propagating through the birefringent crystal 14 are collimated or near-collimated and substantially separated at the input end of the rutile. Thus, the crystal must be of dimensions that will support two beams, combine them, and provide a suitable required delay even in the instance that additional delay is provided by the silicone spacer. However, it can be seen, by comparing FIGS. 6 and 7, that the overall dimensions of the rutile, required to combine and time multplex the two pulse streams is substantially lessened in the embodiment of FIG. 7. Nevertheless, this embodiment requires suitable antireflection coating between the GRIN lens 50a and the silicone spacer.

Figure 8:
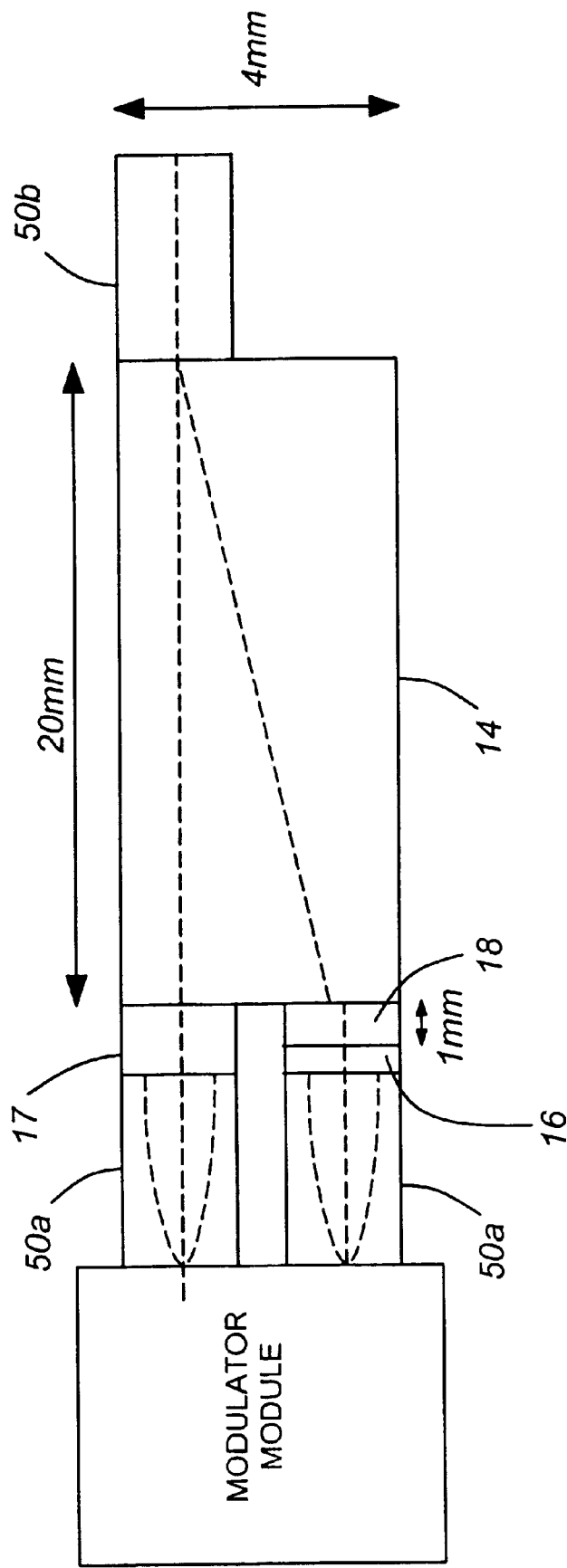
FIG. 8 is a schematic block diagram of a preferred embodiment of the invention showing the modulator module coupled to a rutile crystal via a pair of substantially quarter pitch collimating GRIN lenses; and, FIG. 9 is a schematic block diagram illustrating a polarization beam splitter/combiner in the form of a polarization beam splitting cube.

It is clear that either of the embodiments of FIG. 6 or FIG. 7 can be directly coupled optically to a modulator chip 10 as shown for example in FIG. 8 where the chip is illustrated as coupled to the embodiment of FIG. 7.

In embodiments described heretofore, a half-wave plate is shown for rotating the polarization along one path, however, it is conceivable to provide orthogonally polarized beams of light to the modulator, obviating the requirement of a rotator.

What we claim is:

1. A circuit for receiving two streams of data and for polarization time-division-multiplexing the two streams of data onto a single waveguide such that one of the data streams is delayed by a time $t_d$ from the other data stream, comprising:

a first modulator having an input port and an output port for modulating input light and for providing a first modulated data stream;

a second modulator having an input port and an output port for modulating input light and for providing a second modulated data stream;

a first lens for collimating light provided by the first modulator;

a second lens for collimating light provided by second modulator, the first and second lenses each for providing a substantially collimated substantially unguided beam of light to at least another component;

a polarization beam splitter/combiner having two input ports at one end optically coupled to receive the substantially collimated, substantially unguided beams of light, said polarization beam splitter/combiner having a combining port at another end for combining the data streams wherein optical path from one input port of the splitter/combiner to the combining port is different than optical path from the other input port of the splitter/combiner to the combining port such that one data stream is delayed by a time $t_d$ from the other data stream, whereby the block has both a light combining function and a time delay function, light traversing parallel paths from the first and second lenses respectively to the polarization beam splitter/combiner being substantially unguided, so that light traversing at least one of said parallel paths will have a polarization state which is substantially unchanged.

2. A circuit as defined in claim 1 further comprising means for rotating the polarization of one of the two modulated data streams optically coupled with one of the first and second modulators.

3. An optical circuit as defined in claim 2, wherein the first and second modulators, the means for rotating polarization, and the polarization beam splitter/combiner are all optically coupled without optical fibres therebetween, and wherein the first and second lenses are GRIN lenses.

4. An optical circuit as defined in claim 3, wherein the polarization beam splitter/combiner is a birefringent crystal being of suitable length for providing a path length difference between each of the at least two input ports and the output port to provide a time delay of $t_d$ at the output port between the two data streams.

5. An optical circuit as defined in claim 3, wherein the polarization beam splitter/combiner comprises polarization beam splitting cubes being of suitable dimensions for providing a path length difference between each of the at least two input ports and the output port to provide a time delay of $t_d$ at the output port between the two data streams.

6. An optical circuit as defined in claim 3, wherein the polarization beam splitter/combiner is a birefringent crystal being of suitable length for providing a path length difference between each of the at least two input ports and the output port to provide a time delay of $t_d$ at the output port between the two data streams in combination with a delay element disposed in the optical path between one of the modulators and a longest path from one of the input ports of the birefringent crystal to its output port.

7. A circuit as defined in claim 1 wherein a geometrical distance from each modulator output port to respective optically coupled input ports of the polarization beam splitter/combiner are is substantially the same, and wherein the optical path lengths from the first and second modulator output ports to the combining port of the polarization beam splitter/combiner are different to effect the time delay $t_d$.

8. The circuit as defined in claim 1, further comprising a spacer element disposed in one of the parallel paths with a means for rotating polarization disposed in the other path, the spacer element for equalizing a geometric distance between parallel paths from the output ports of the modulators to the input ports of the polarization beam splitter/combiner.

9. The circuit as defined in claim 1, wherein the lenses are GRIN lenses, the circuit further comprising a spacer element in at least one of the parallel paths having a refractive index substantially higher than an average refractive index of either of the GRIN lenses for substantially delaying a beam of light propagating therethrough.

10. The circuit as defined in claim 9, wherein the spacer element is made of silicon.

11. The circuit as defined in claim 10, wherein the polarization beam splitter combiner is a birefringent crystal.

12. A circuit for receiving two streams of modulated data and for polarization and time-division multiplexing the two streams onto a single waveguide, comprising:

a light source for providing a primary signal;

a first and a second modulator for independently, and in parallel, modulating portions of the primary signal, the first and second modulators for providing two data streams means for operating on at least one of the two data streams and for providing different polarization states between the two data streams; and, a birefringent crystal having at least two input ports at an end thereof disposed to receive substantially unguided collimated light from first and second modulators, said unguided collimated light being in the form of two modulated data streams having different polarization states, the birefringent crystal having an output port disposed at an opposite end thereof to receive and combine the two modulated data streams into a single time-interleaved data stream, the birefringent crystal being optically coupled with the modulators in the absence of optical fiber therebetween, the birefringent crystal being of suitable shape and dimensions to provide a required optical path length difference between the two modulated data streams passing therethrough to time multiplex the two data steams into the single data stream whereby birefringent crystal has both a combining function and a time delay function.

13. An integrated fiberless optical circuit for receiving two streams of modulated data and for polarization multiplexing the two data streams onto a single waveguide, comprising:

a modulator for independently, and in parallel, modulating two optical signals, the modulator for providing two modulated data streams;

means optically coupled with the modulator in a fiberless manner for operating on at least one of the two data streams and for providing different polarization states between the two data streams; and, a polarization beam splitter/combiner (PBS/C) having at least two input ports optically coupled in a fiberless manner to the modulator and the means for providing different polarization states, an end of the PBS/C disposed to receive the two modulated data streams having different polarization states, the PBS/C having an output port disposed at an opposite end thereof to receive and combine the two modulated data streams into a single time multiplexed data stream, the PBS/C being of suitable dimensions to provide a required optical path length difference between the two modulated data streams passing therethrough to time multiplex the two data steams into the single data stream in the absence of other delay means, or the PBS/C being of suitable dimensions to provide a required optical path length difference between the two modulated data streams passing therethrough to time multiplex the two data steams into the single data stream in the presence of a delay means having a refractive index difference of at least 0.5 from that of air.

14. A method of multiplexing optical signals onto an output port, comprising the steps of:

providing two modulated polarized optical signals having a polarization difference between the two modulated signals of substantially 90 degrees;

passing one of the two modulated signals along a first path in a birefringent crystal; and passing another of the two modulated signals along a second path intersecting the first path at the output port of the birefringent crystal, whereby the modulated signals are combined, wherein the modulated signals are passed to the birefringent crystal in the absence of optical fiber, and wherein the first path and the second path are of different length, whereby the birefringent crystal combines the two modulated signals into a single time-interleaved data stream.

15. A method as defined in claim 14, further comprising the step of passing one of the two modulated polarized optical signals through an additional delay element having a refractive index substantially different than the refractive element of the birefringent crystal.

16. A fibreless optical circuit for receiving two streams of modulated data and for polarization multiplexing the two data streams onto a single waveguide, comprising:

a modulator module for independently, and in parallel, modulating optical signals and for providing two data streams;

a birefringent crystal having at least two input ports at an end thereof disposed to receive the two modulated data streams having different polarization states, the birefringent crystal having an output port disposed at an opposite end thereof to receive and combine the two modulated data streams into a single multiplexed data stream, the birefringent crystal being of suitable dimensions to provide time division polarization multiplexing and optical path difference between the two modulated data streams, the circuit being fibreless such that there is an absence of optical fiber between the modulator module and the birefringent crystal for coupling light therebetween.

17. A fibreless optical circuit as defined in claim 16, further comprising a first GRIN lens providing a first path disposed between the modulator module and the birefringent crystal for providing a substantially collimated beam at one of the input ports of the birefringent crystal, and, a second GRIN lens providing a second path disposed between the modulator module and the birefringent crystal for providing a substantially collimated beam at the other of the input ports of the birefringent crystal.

18. A fibreless optical circuit as defined in claim 17, further comprising one or more light transmissive spacer elements disposed between the modulator module and the birefringent crystal.

19. A fibreless optical circuit as defined in claim 18, wherein at least one of the light transmissive spacer elements has a substantially different refractive index from an other.

20. A fibreless optical circuit as defined in claim 19, wherein one of the light transmissive spacer elements is optically coupled with the first GRIN lens, and wherein the other light transmissive spacer element having a substantially different refractive index is optically coupled with the second GRIN lens.

21. A fibreless optical circuit as defined in claim 20, wherein the refractive index of the one of the spacer elements is substantially the same as the refractive index of the a portion of the first GRIN lens, and wherein the refractive index of the other of the spacer elements is substantially different than the refractive index of any portion of the second GRIN lens.

* * * * *

UNITED STATES PATENT AND TRADEMARK OFFICE
CERTIFICATE OF CORRECTION

PATENT NO. : 6,607,313 B1
DATED : August 19, 2003
INVENTOR(S) : Farries et al.

Figure 9:
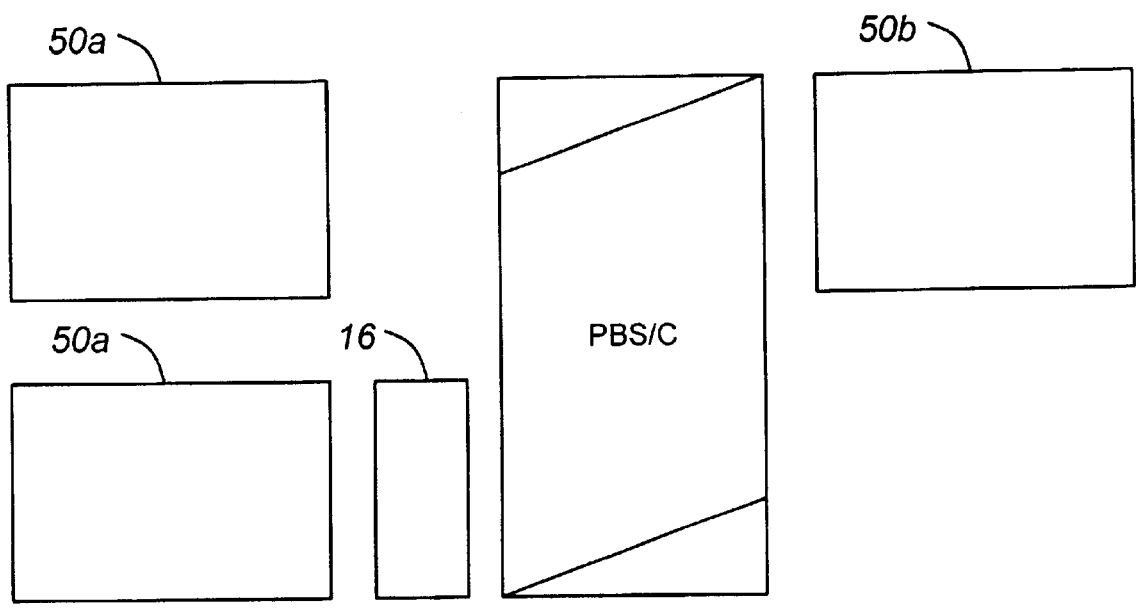

It is certified that error appears in the above-identified patent and that said Letters Patent is hereby corrected as shown below:

Column 6,
Line 61, insert the following:
-- Numerous other embodiments can be envisaged without departing from the invention, for example, the polarization splitter/combiner described heretofore, is a rutile crystal, however, a polarization beam splitting cube could be used instead of the rutile as is shown in Fig. 9. --

Column 7,
Line 22, "streams wherein" should read -- streams, wherein --

Column 8,
Line 28, "streams" should read -- streams;" --

Signed and Sealed this

Sixth Day of July, 2004

JON W. DUDAS
*Acting Director of the United States Patent and Trademark Office*